(12) United States Patent
Haggerty et al.

(10) Patent No.: US 8,265,428 B2
(45) Date of Patent: Sep. 11, 2012

(54) METHOD AND APPARATUS FOR DETECTION OF DATA IN A DATA STORE

(75) Inventors: John Haggerty, Merseyside (GB); David Llewellyn-Jones, Liverpool (GB)

(73) Assignee: Forsigs Limited, Liverpool (GB)

( * ) Notice: Subject to any disclaimer, the term of this patent is extended or adjusted under 35 U.S.C. 154(b) by 1049 days.

(21) Appl. No.: 12/152,335

(22) Filed: May 13, 2008

(65) Prior Publication Data

US 2009/0287647 A1   Nov. 19, 2009

(51) Int. Cl.
*G06K 9/54* (2006.01)
(52) U.S. Cl. .................................................. 382/305
(58) Field of Classification Search ............... 382/209, 382/218, 305; 726/22
See application file for complete search history.

(56) References Cited

U.S. PATENT DOCUMENTS

| 7,165,069 B1* | 1/2007 | Kahle et al. ............................ 1/1 |
| 7,779,032 B1* | 8/2010 | Garfinkel ........................ 707/776 |
| 2007/0085710 A1* | 4/2007 | Bousquet et al. ................. 341/50 |
| 2007/0283158 A1* | 12/2007 | Danseglio ....................... 713/180 |
| 2009/0094203 A1* | 4/2009 | Kim et al. .......................... 707/3 |
| 2009/0164427 A1* | 6/2009 | Shields et al. ..................... 707/3 |

FOREIGN PATENT DOCUMENTS
EP            0 893 763        * 1/1999
* cited by examiner

*Primary Examiner* — Daniel Mariam
(74) *Attorney, Agent, or Firm* — Smyrski Law Group, A P.C.

(57) ABSTRACT

A method of determining whether particular data is included in a data store. The particular data comprises a plurality of first data values and the data store comprises a plurality of second data values. The method comprises obtaining identification data associated with the particular data. The identification comprises a subset of said first data values. A portion of the data store is retrieved and it is determined whether at least a predetermined number of data values of the identification data have a predetermined relationship with corresponding second data values of the retrieved portion of the data store.

38 Claims, 9 Drawing Sheets

METHOD AND APPARATUS FOR DETECTION OF DATA IN A DATA STORE

BACKGROUND OF THE INVENTION

1. Field of the Invention

The present invention relates to methods and apparatus for detecting whether particular data is stored in a data store. The method has particular, although not exclusive, applicability in determining whether an image of interest is stored in a data store.

2. Description of the Related Art

Computers are commonplace in modern society. Computers are now commonly used in domestic and business environments. Many computers are now connected together using computer networks, so as to allow the computers to share data and resources with one another. Use of the Internet is now widespread. Many computers are connected to the Internet so as to be able to communicate with one another and so as to be able to retrieve data from remote computers. One very popular use of the Internet is in retrieving data over the world wide web in the form of web pages.

The ubiquity of computers has undoubtedly brought many economic and cultural benefits, but it has also created many technical and social challenges. While the Internet allows data and information to be shared amongst networked devices in a convenient and efficient manner, it cannot be overlooked that the Internet has been used by some to further their criminal activities. A particular concern relates to use of the Internet by paedophiles to distribute malicious digital pictures, in particular indecent images of children, between one another. Such criminal activity is a focus for law enforcement and other governmental agencies in their resolve to protect the public.

In order to address the challenges posed by criminal use of the Internet various computer forensics techniques are routinely used. Crime involving computers may be classified in three classes: the computer is the target of the crime; the computer provides a repository of information used or generated during the commission of a crime; or the computer is a tool used in committing the crime. These different classes of computer crime mean that a wide range of investigation and analysis techniques are needed to properly address all classes of crime. The techniques used often rely on the context surrounding the criminal activity under scrutiny.

Computer forensics techniques are frequently used to inspect the contents of a computer hard drive of a suspect in a criminal investigation. Due to the greater capacity of today's hard disk drives (upwards of 500 Gigabytes) and the amount of information that may be held on such a hard disk drive, a large volume of data needs to be analysed within tight temporal constraints. Yet, identification of relevant evidence is a time-consuming process. A major challenge facing law enforcement and national security agencies is accurately and efficiently analysing this growing volume of evidential data. The diversity of devices and file systems used, from desktop computers and notebooks to Personal Digital Assistant (PDAS) and mobile phones, should also be taken into account when determining the techniques which are to be used.

Current methods of searching a hard drive for files of interest, and in particular malicious digital pictures, often involve time-consuming manual processing. An image of the hard drive is taken to replicate the original evidence source. A forensics tool is then used to recreate the logical structure of the underlying file system from the created image. A computer forensic analyst then views the files, both extant and deleted, and files of interest are reported with supporting evidence, such as time of investigation, analyst's name, the logical and actual location of the file, and so on. As the investigation of the hard disk drive relies on the analyst viewing files as if part of the file system, this process is laborious and could be prone to human error.

Attempts have been made to improve the speed of the search. One technique which has been proposed involves comparing checksums of files on a hard disk drive under investigation to checksums of known malicious files recorded from previous investigations. One checksum which has been used in such comparisons in the MD5 checksum. Two problems remain with this practice. First, recent research has questioned the reliability of MD5 checksums in producing digital signatures and this will have serious ramifications within the legal arena. Second, a suspect may avoid detection of a file of interest to law enforcement agencies by altering just one byte within the file of interest, which will alter the MD5 checksum produced. Indeed, techniques based upon checksums have been used to detect copyright infringements on the popular YouTube site, and users of that site are actively defeating this type of detection technique by altering a single or small number of bytes within a file.

SUMMARY OF THE INVENTION

It is an object of embodiments of the present invention to obviate or mitigate one or more of the problems set out above.

According to a first aspect of the present invention, there is provided a method of determining whether particular data is included in a data store. The particular data comprises a plurality of first data values, and the data store comprises a plurality of second data values. The method comprises obtaining identification data associated with said particular data, said identification data comprising a subset of said first data values; retrieving a portion of said data store; and determining whether at least a predetermined number of first data values of said identification data have a predetermined relationship with corresponding second data values of said retrieved portion of the data store.

According to a second aspect of the present invention, there is provided a method of determining whether particular data is included in a data store. The particular data comprises a plurality of first data values arranged in a plurality of first segments, and the data store comprises a plurality of second data values arranged in a plurality of second segments. The method comprises: obtaining identification data associated with said particular data, said identification data comprising first data values taken from one of said first segments; retrieving one of said second segments from said data store; and determining whether at least a predetermined number of first data values of said identification data have a predetermined relationship with corresponding second data values of said retrieved second segment.

The predetermined relationship between corresponding first and second data values may be equality, and the data values may be bytes of data. The particular data may be a file, and more particularly an image file such as a digital picture file.

According to a third aspect of the present invention, there is provided a method of determining whether particular data is included in a data store. The particular data comprises a plurality of sequentially ordered first data values and the data store comprises a plurality of sequentially ordered second data values. The method comprises determining whether a predetermined subset of said first data values have a predetermined relationship with corresponding second data values.

The plurality of sequentially ordered first data values may form a segment of said particular data. The plurality of sequentially ordered second data values may form a segment of said data store.

BRIEF DESCRIPTION OF THE DRAWINGS

Embodiments of the present invention will now be described, by way of example only, with reference to the accompanying drawings, in which.

DETAILED DESCRIPTION OF THE INVENTION

Aspects of the present invention allow particular data to be identified through the use of identification data associated with the particular data. The identification data for particular data is referred to herein as its 'signature'. The identification data comprises data values taken from the particular data. This is advantageous over the use of some checksum algorithms in generating identification data, given that it is possible to detect the particular data even if the data store includes a copy of the particular data in which some of the data values have been changed.

Aspects of the invention have a wide range of applications. One particular application of embodiments of the invention is in searching raw data for evidence of illegal or suspicious digital pictures resident or deleted on the hard disk drive. In such a case identification data associated with illegal or suspicious digital pictures is obtained and used in the methods described herein. If illegal or suspicious digital pictures are identified using the methods described herein, their identification and location are reported to an analyst. Further information can then be obtained from a manual search using the logical file structure of the hard disk drive. Such information may include times of file creation, access or modification and so on.

The use of identification data in this way is advantageous as it allows a data store to be searched relatively quickly. In particular, the speed of search is considerably improved as compared to techniques currently in widespread use which rely heavily upon manual searching. Given the quantities of data that must be searched in today's large-volume hard disk drives, manual searches are a time-consuming process, often leading to backlogs within computer forensic departments. While a manual inspection of particular parts of a suspect data store may be required when the methods described herein are employed, the use of identification data as described herein can efficiently direct an analyst to the relevant areas of a hard disk drive.

The use of segments in some aspects of the invention is based upon the arrangement of data in the data store. More particularly, it is common for data to be organised in segments (sometimes referred to as blocks, clusters or sectors) on a storage device. A single file will often be stored in a plurality of segments, and the segments making up a file may not be arranged contiguously within the data store. That is, data making up a single file may be segmented into segments which are not stored contiguously. By using identification data being a whole or part of such a segment, data of interest can be effectively identified even if the data is severely fragmented, given that only a single segment need be used for the purposes of identification. Similarly, where a file of interest is deleted, it will often be the case that at least some segments of the file remain in the data store, although such segments are noted as deleted in some data structure. The search techniques described herein can identify that a file of interest was stored in the data store so long as at least the segment of interest remains stored in the data store.

The data store may take any convenient form and may be a file or the entirety of a storage device. In some embodiments the data store may be an image of a storage device. That is, the data store may be created by taking a byte-by-byte copy of the storage device. Taking an image of the storage device in this way allows data on the storage device to be effectively searched (by searching the data store) while at the same time ensuring that the integrity of the storage device is preserved. The storage device may be a non-volatile storage device such as a hard disk drive or a flash device. The storage device can be associated with any computing device including small portable computing devices such as mobile telephones and personal digital assistants.

Segments of the particular data may be of the same size as, or of different size to, segments of the data store. In one preferred embodiment segments of the particular data comprise 512 bytes of data while segments of the data store comprise 4096 bytes of data. It is preferred that segments of the data store comprise a number of bytes of data which is an integer multiple of the number of bytes of data included in a segment of the particular data.

The data store may comprise data retrieved from the Internet. In one embodiment the method may further comprise using web-crawler techniques to retrieve data of interest (e.g. image files) from the Internet for storage in the data store. In such a case the method may further comprise selecting a web page; following at least one link from said selected webpage to a further webpage; retrieving data from at least one of said selected web page and said further webpage; and storing said retrieved data in said data store. The selecting and the following may be repeated a plurality of times, and data may be retrieved from a plurality of further webpages for storage in the data store.

The inventors have realised that the use of a predetermined subset of said first data values in said determining is advantageous given that changes to only a small number of data values will still allow determination that the particular data is included in the data store. The predetermined subset of first data values is preferably distributed through the first segment thereby improving the robustness of detection, as described further below.

The invention can be implemented in any convenient way. For example the invention can be implemented using suitable computer programs. Such computer programs may be stored on computer readable media. Suitable computer readable media include (although are not limited to) tangible computer readable media such as disks and CD-ROMs. The invention can also be implemented by way of a suitably programmed apparatus. Further aspects of the invention therefore provide suitable apparatus.

Figure 1:
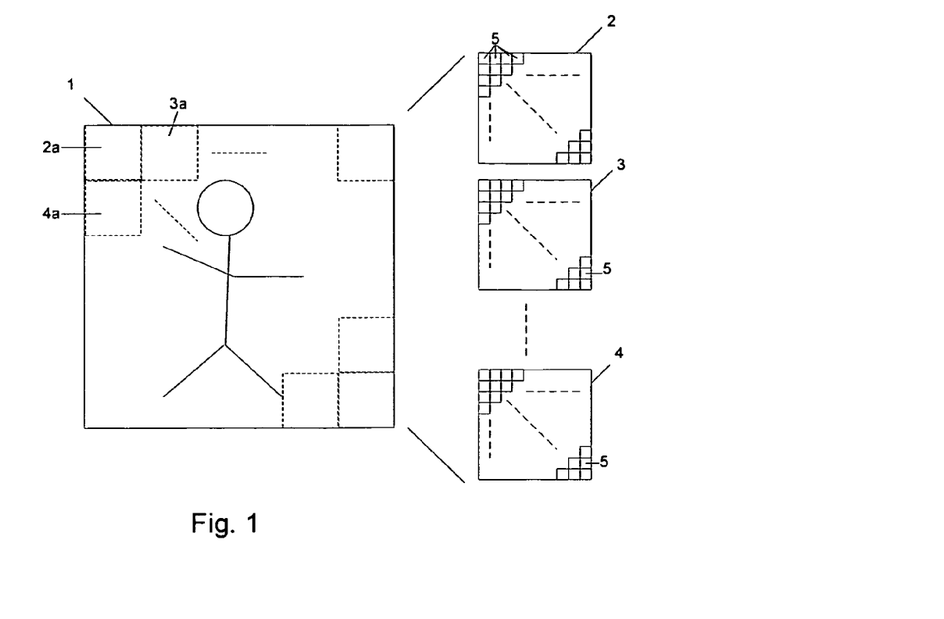
FIG. 1 is a schematic illustration of a digital image and some of its constituent blocks.

FIG. 1 shows a digital image 1. The digital image is stored as a plurality of blocks, three of which 2, 3, 4 are shown in FIG. 1. In some embodiments the digital image 1 is a bitmap, and in such a case the blocks 2, 3, 4 each contain pixel values 5 of respective contiguous areas of the image 1. More specifically the block 2 contains pixel values of an area 2a of the image 1, the block 3 contains pixel values of an area 3a of the image 1 and the block 4 contains pixel values of an area 4a of the image 1.

Each of the pixel values 5 is described herein as a byte (i.e. 8-bits) of data. It will however be appreciated that each pixel value can be defined using any convenient number of bits.

Although, in the example described with reference to FIG. 1 the digital image 1 is a bitmap, and the blocks 2, 3, 4 each contain pixel values 5 of respective contiguous areas of the image, images can be stored in other ways. In particular the digital image 1 may be stored in a plurality of blocks storing data values generated by an appropriate compression process. In such a case each block will not necessarily contain pixel values of a contiguous area of the image. One such compression process is that used in the Joint Photographic Experts Group (JPEG) standard.

Figure 2:
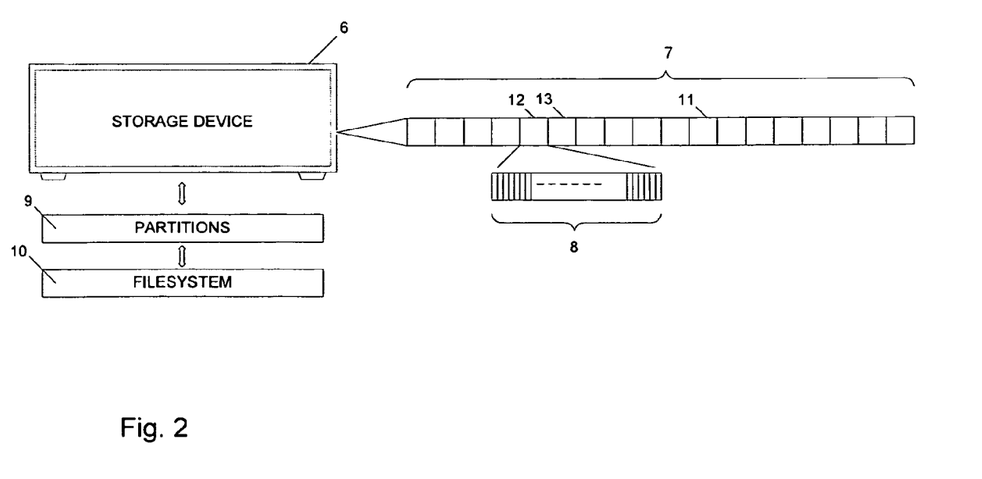
FIG. 2 is a schematic illustration showing how data is stored on a mass storage device.

The digital image 1 can be stored on a mass storage device 6, as shown in FIG. 2. The mass storage device can take any suitable form and can be, for example, a hard disk drive.

The mass storage device 6 stores data organised into a series of segments 7. These segments are sometimes referred to as sectors, clusters or blocks. Each segment is arranged to store a finite amount of information in the form of particular number of bytes 8. For example, in systems using the Linux operating system a segment (commonly referred to as a block in a Linux based system) typically has a size of 512 bytes. In systems using a Windows based operating system a segment (commonly referred to as a cluster in a Windows based system) typically has a size of 4,096 bytes.

The mass storage device 6 can be configured into one or more partitions 9. Configuring the mass storage device 6 into a plurality of partitions 9 allows the mass storage device 6 to appear to be a number of individual storage devices which can be referenced by an underlying operating system of a computing device having access to the mass storage device 6.

The partitions 9 are accessed by a file system 10 provided by an operating system running on the computing device having access to the mass storage device 6. The file system 10 determines how data is stored on the mass storage device 6 and provides a logical map of data resident within a particular partition of the mass storage device 6 allowing data to be stored in and retrieved from the segments 7. The file system 10 typically provides directory management capabilities allowing files to be arranged in directories for ease of organisation and convenient access. Directories provide a hierarchical organisation of files stored on the mass storage device 6. Operations provided by the file system 10 allow data stored on the mass storage device 6 to be more readily accessed and manipulated.

A file stored on the mass storage device 6 is, in essence, a data structure created by a person or system that holds information of relevance for a user in a manner that can be accessed and managed by the operating system. A file stored on the mass storage device 6 will often be much larger than the size of a particular segment. The file is therefore segmented and stored in a plurality of segments which may or may not be sequentially ordered on the mass storage device 6. For example, the blocks 2, 3, 4 of the digital image 1 could be respectively stored in segments 11, 12, 13 of the segments 7 stored on mass storage device 6.

The segments associated with a particular file are referred to in a master file table managed by the file system 10 so as to allow the particular file to be recreated when accessed by the user in an associated application, by retrieving the data from the relevant sectors 7.

A file will rarely have a size which is an integer multiple of the number of bytes stored in a single segment. As such, the last segment storing data of a particular file will contain as much information as required together with an end of file (EOF) indicator located immediately after the final byte of the last segment. The EOF indicator is used by the operating system when the relevant segment of the file is read from the mass storage device 6. The file system reads data from the relevant segment up to the EOF indicator, but no further.

The use of EOF indicators in this way gives rise to the condition known as "slack" space. As the last segment may have been used previously to store data associated with a different file, data from that different file may not have been entirely overwritten given that data from that different file may extend beyond the position of the EOF indicator within the segment. Thus, partial file fragments of deleted files may exist and can be retrieved from the mass storage device 6 using appropriate software.

Methods for determining whether the mass storage device 6 stores or has stored images of interest are described. Such methods have applicability in a range of different applications, including searching for malicious images for the purposes of criminal investigations, as described herein.

Figure 3:
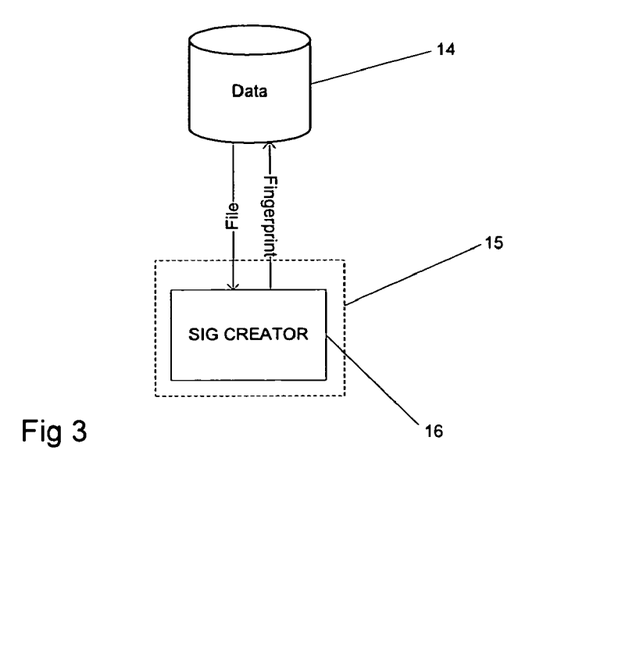
FIG. 3 is a schematic illustration of a system for creating and storing a signature of a digital image of the type shown in FIG. 1.

Referring now to FIG. 3, a database 14 is arranged to store digital images. It is desired to determine whether the digital images stored in the database 14 are stored on the mass storage device 6. The database 14 additionally stores signatures of the digital images stored in the database 14. Images can be added to the database 14 from any suitable external source such as a digital camera or a further database of images of interest.

The database 14 is accessed by a computer 15 which runs a signature data creator 16. The signature data creator 16 is arranged to retrieve a digital image from the database 14 and to create a signature of the retrieved digital image. The created signature is then stored in the database 14 alongside the digital image. The signature of a particular digital image is used to determine whether the particular digital image is stored on the mass storage device 6 in search operations of the type described below. The nature of the signature will therefore have an impact on the effectiveness of the determination.

One approach would be to use a whole digital image file as the signature. Such an approach does, however, have disadvantages. First, digital images may be defined by hundreds of kilobytes of data, thereby requiring a large signature to be read from the database 14 for use in search operations. Additionally, carrying out comparisons based upon a signature of that size is relatively computationally expensive. Secondly, only one byte of the data representing an image would need be altered to give rise to a false negative. That is an image would not be detected when in fact it is present within searched data if only a single byte is changed even though the change to that single byte makes little or no difference to the way in which the image is perceived by a user. Thirdly, segments allocated to a digital image may not be sequentially ordered on the underlying storage media (as described above). This can make searches involving large signatures difficult and computationally expensive, if not ineffective.

As described above, the size of many image files means that data associated with a particular file is segmented between a plurality of different segments. Therefore, in a preferred embodiment the signature data creator 16 selects one or more arbitrary segments of an image file to act as a signature for the digital image. Segments of the image file can be created by segmenting the stream of byte values representing the image into a plurality of segments, each segment (apart from perhaps the last segment) comprising a predetermined number of byte values. By using a single segment of the digital image file, searches need not rely upon a file being sequentially ordered on the mass storage device 6.

That is, if an image of interest is stored on the mass storage device 6, all of its constituent segments should be stored on the mass storage device 6. While the segment of the image which acts as a signature could reside anywhere on the mass storage device 6, location of the segment which acts as the signature by a search process will determine that the digital image of interest is stored on the mass storage device 6. (Or alternatively that the digital image or interest was stored on the mass storage device 6 but has been deleted.) Searching for a single segment of the image is a convenient way of locating a file given that segmentation of the image need not be taken into account during the search process. In particular, a single segment can be located regardless of whether immediately preceding and immediately succeeding segments are related to the same file, or to a different file.

Figure 4:
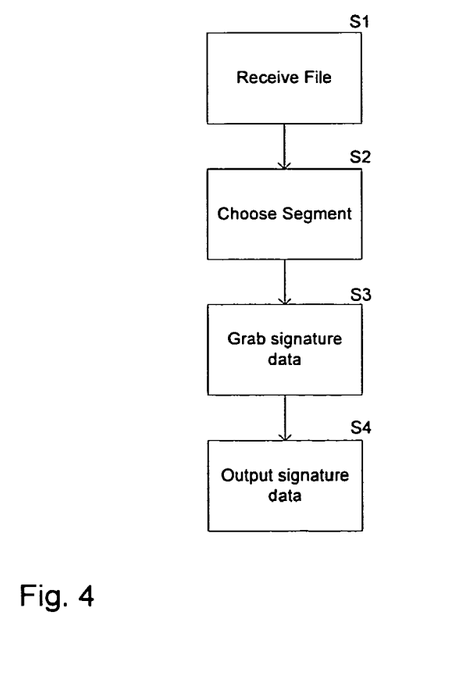
FIG. 4 is a flowchart showing processing carried out in the system of FIG. 3.

Processing carried out by the signature data creator 26 of FIG. 3 is shown in the flowchart of FIG. 4. At step S1 a file for which a signature is to be created is retrieved from the database 14. At step S2 a segment of the file is selected from which a signature is to be created. At step S3 signature data is obtained by obtaining byte values from the selected segment. At step S4 the signature data is output to the database 14 where it is stored together with the corresponding image data.

When selecting one or more segments of a digital image to act as a signature, segments other than the first and last segments of the digital image are preferably selected. This is because the first segment may hold generic data such as data setting up fonts, data identifying a camera with which an image was created, time and date information and so on, and because the last segment may, for the reasons set out above, be an incomplete segment. That is, the last segment may include slack space and therefore provides a less reliable signature. Using either of the first and last segments is more likely to lead to false positives, that is indications that an image is stored on the mass storage device 6 when in fact it is not. This is described further below with reference to experiments carried out by the inventors.

It will be appreciated that the creation of signatures in the manner described above is based upon the fact that data on the mass storage device is stored in segments. As such, an image of interest can be similarly segmented into segments and one or more of those segments can then be used as a signature. In one embodiment of the invention, the segments created from the image of interest are of equal size to the segments used to store data on the mass storage device 6. However, in alternative embodiments of the invention, the size of the segments used for signature generation may differ from that used for the storage of data on the mass storage device 6.

In one preferred embodiment, the size of segments created from the image of interest is 512 bytes. This is the smallest segment size used by common operating systems, while other operating systems use segment sizes that are integer multiples of 512 bytes. As such, using segments having a size of 512 bytes will allow search operations to be carried out on the mass storage device regardless of whether the mass storage device uses segments of equal or different size. This is described in further detail below.

Figure 5:
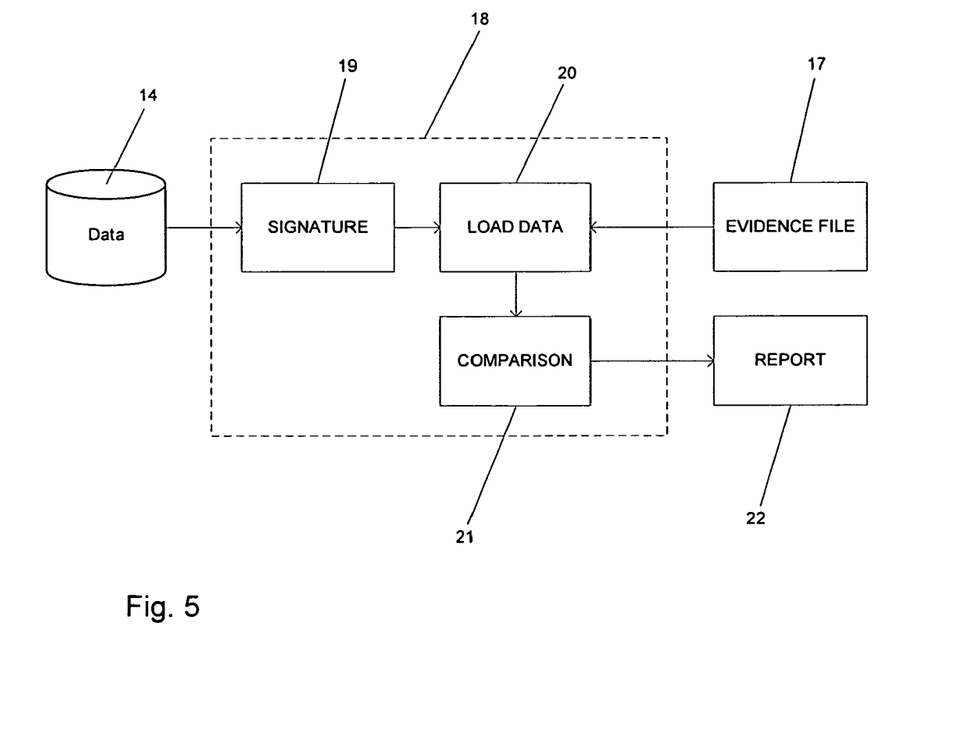
FIG. 5 is a schematic illustration of a system for detecting a digital image stored on a mass storage device such as that shown in FIG. 2 using a signature created using the system of FIG. 3.

Referring now to FIG. 5, a process for detecting whether an image of interest stored in the database 14 is included in an evidence file 17 is described. The evidence file 17 is an image of data stored on the mass storage device 6. That is, where the search operations are being carried out for the purpose of identifying images indicating criminal activity, the evidence file 17 may be generated by taking an image from a hard disk drive seized from a suspect's computer. The evidence file 17 is created by copying the hard disk drive in a robust manner in order to protect the original data stored on the hard disk drive. This is a requirement of current practice whereby analysis is not carried out on the hard disk drive directly, as this may alter evidence located there. Every byte is copied from the hard disk drive such that the evidence file 17 is an exact duplicate of the data stored on the hard disk drive, thereby protecting the integrity of the evidence. The raw data on the imaged hard drive at byte level forms the evidence file which is processed in the manner described below.

The database 14 and the evidence file 17 are processed using search processing 18. A signature 19 of a file of interest is retrieved from the database 14, the signature 19 having been generated using the processing described above with reference to FIGS. 3 and 4. The evidence file 17 is read a byte at a time to ensure that all bytes are analysed.

A signature search is performed by loading segments of data from the evidence file 17 using a data loader 20, for comparison with the signature 19. The signature 19 is compared to each loaded segment of the evidence file by a signature comparison 21. If a match is found between a segment of the evidence file 17 and the signature 19 a report 22 is generated. Processing carried out by the file detection system is described in further detail with reference to FIG. 6.

Figure 6:
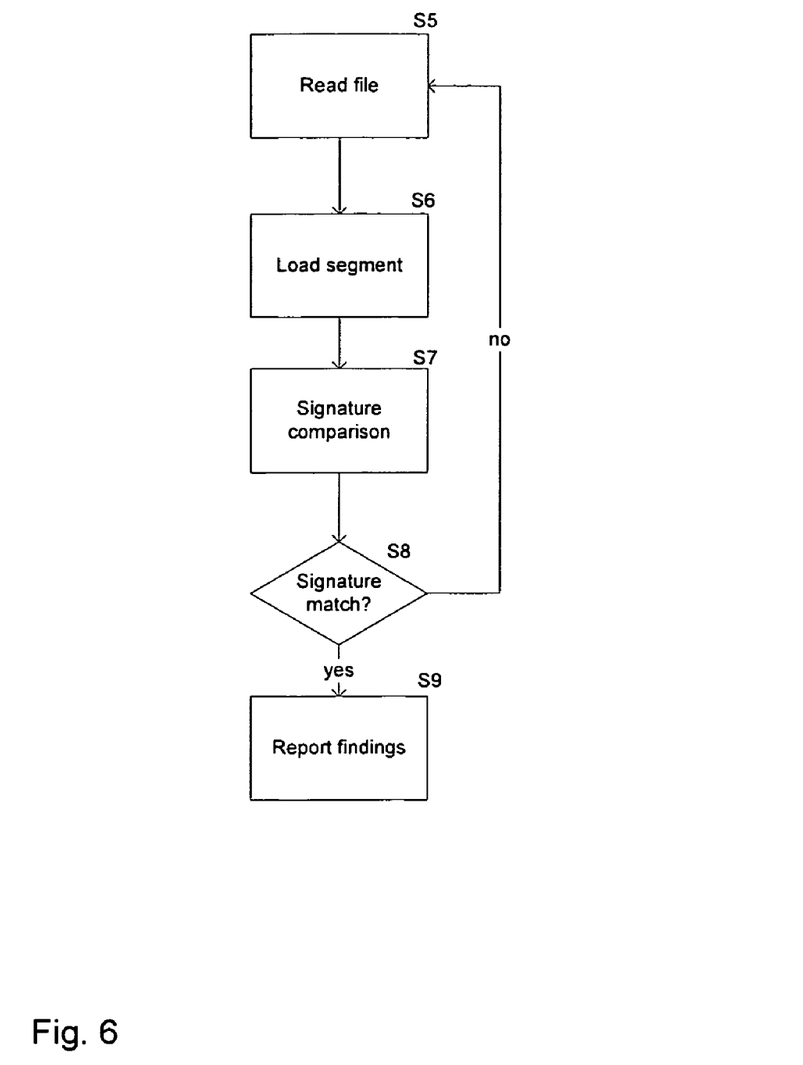
FIG. 6 is a flowchart showing processing carried out in the system of FIG. 5.

At step S5 the evidence file 17 is read and at step S6 a segment of the evidence file is loaded. At step S7 the signature 19 is compared to the loaded segment of the evidence file. At step S8 a test is performed to determine if the signature 19 matches the currently loaded segment of the evidence file 17. If it is determined that there is not a match then processing returns to step S5 where the evidence file is read so as to obtain a further segment. If the signature 19 matches the data in the currently loaded segment then at step S9 a report is generated indicating that data in the evidence file matches data in the signature.

It has been described above that the comparison between the signature 19 and segments of the evidence file 17 may be carried out effectively even if the segments of the evidence file are of differing size to segments of the signature. This is described further with reference to FIG. 7.

Figure 7:
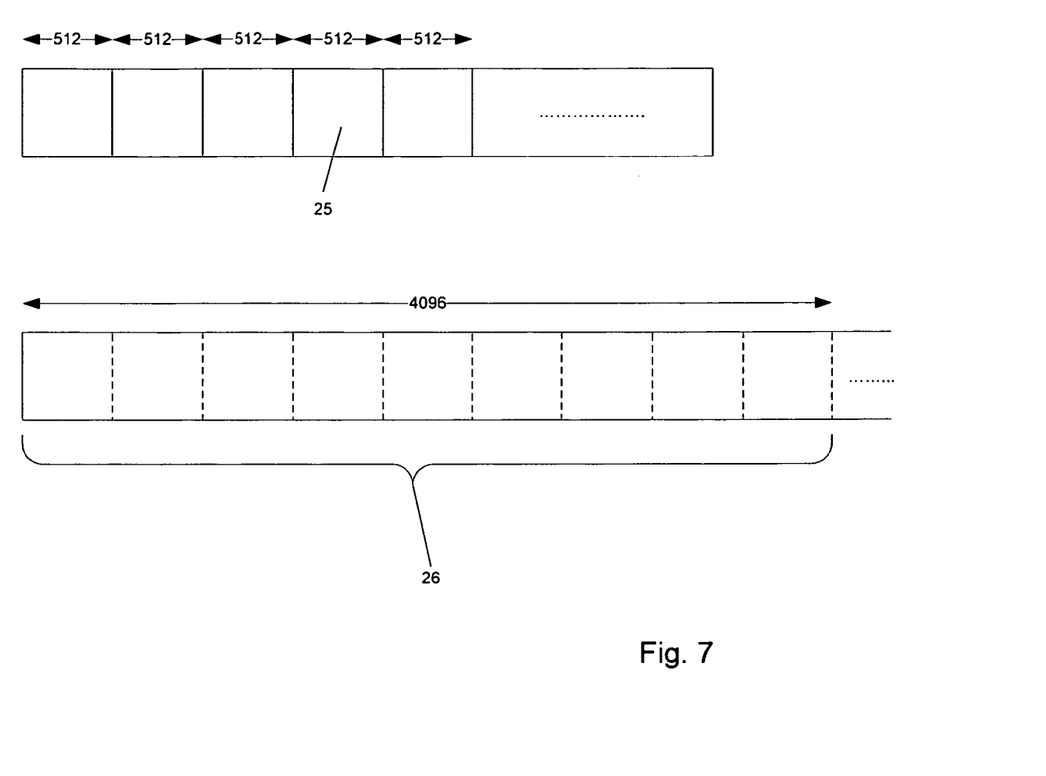
FIG. 7 is a schematic illustration showing comparison operations carried out in the processing of FIG. 6.

FIG. 7 schematically shows the digital image 1 and some of its constituent segments, each storing 512 bytes of data. Each of the illustrated segments corresponds to one of the blocks described with reference to FIG. 1. A segment 25 is selected to act as a signature for the digital image 1, and it is therefore this segment 25 that constitutes the signature 19 shown in FIG. 5.

FIG. 7 further shows part of the evidence file 17 and in particular a segment 26 of the evidence file 17. The segment 26 stores 4096 bytes of data. The segment 26 stores 4096 bytes of data because this is the number of bytes of data in a segment on the hard disk drive which was used to create the evidence file 17 as described above. It can be seen that one 4096 byte segment of the evidence file has a size eight-times that of the 512 byte segments of the image 1.

Where the segments of the evidence file and the signature take the form shown in FIG. 7, the comparison between the segment 26 of the evidence file 17 and the signature comprising the segment 25 of the digital image 1 is carried out as follows.

The segment 26 is shown in FIG. 7 broken up into eight parts, as depicted by broken lines. Each part of the segment 26 is compared with the signature comprising the segment 25 in turn, to determine whether the bytes of the segment 25 match any one of the parts of the segment 26. In this way the segment of smaller size 25 used to define the signature 19 can be compared with each part of the segment 26.

It will be appreciated that the processing described with reference to FIG. 7 can be carried out in any circumstance in which the segment 26 is of greater size than the segment 25, and the size of the segment 26 is an integer multiple of the size of the segment 25. Of course, where the size of the segments 25, 26 is equal, a single direct comparison operation between the segments can be carried out.

The comparison between a particular segment of the evidence file 17 and the signature 19 is now described further. In one embodiment of the invention, a signature is compared to a segment of the evidence file by checking for equality between each byte of the signature and each corresponding byte of the segment of the evidence file. In such a case a match may be reported only if all bytes of the signature match the corresponding bytes of the segment of the evidence file.

While such a comparison can be used, it is preferable to use a comparison mechanism which allows a match to be reported even if some bytes of the signature do not match the corresponding bytes of the segment of the evidence file which is currently being processed. This defeats attempts to avoid detection of particular images by changing particular byte values.

In one preferred embodiment of the invention, the comparison between the signature 19 and a segment of the evidence file 17 is carried out by determining whether selected bytes of the signature have values equal to those of corresponding bytes of a segment of the evidence file 17. In one embodiment 16 points of reference within the signature are chosen for the purposes of comparison. The positions that are chosen can be chosen arbitrarily to prevent manipulation of files to avoid detection. The use of 16 points of reference has been chosen to reflect the 16-point minimum standard used in United Kingdom for human fingerprint matching. It will be appreciated that a differing number of points of reference may be used.

Figure 8:
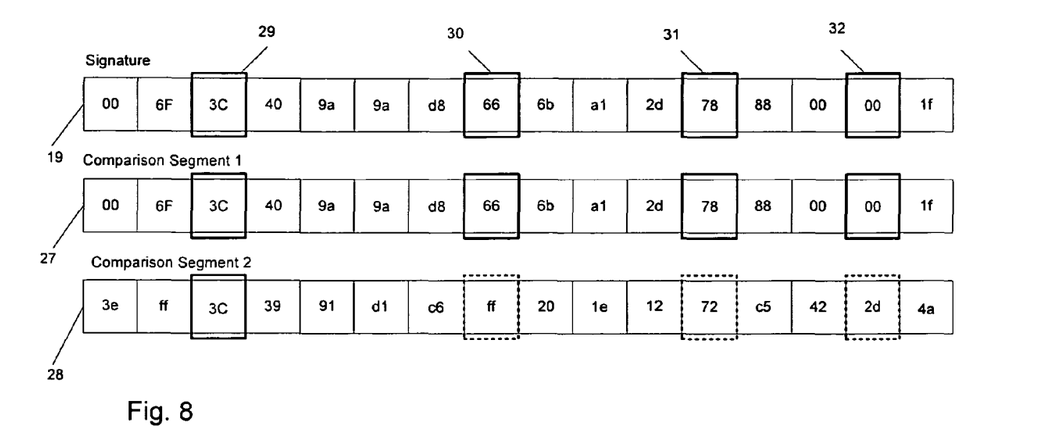
FIG. 8 is a schematic illustration of a comparison between a segment of a digital image of the type shown in FIG. 1 and two segments of the mass storage device of FIG. 2.

FIG. 8 is an illustration of a part of the signature 19 and a comparison with two segments 27, 28 read from the evidence file 17. For the purpose of this example the signature 19 and the segments 27, 28 are compared with reference to four bytes 29, 30, 31, 32 selected for the purposes of comparison. These four bytes can be defined by their offset from the start of the signature and the segments.

Referring to the segment 27 of the evidence file 17, it can be seen that corresponding bytes of the segment 27 have values equal to those of the bytes 29, 30, 31, 32 of the signature 19. As such, the segment 27 is considered to match the signature 19. It can also be seen that in the segment 28 the byte corresponding to the byte 29 of the signature 19 has an equal value to that of the byte 29. However bytes of the segment 28 corresponding to the bytes 30, 31, 32 of the signature 19 do not have equal values, such that there is no match between the signature 19 and the segment 28.

The number of points to be used as a basis for comparison may be determined globally for all signatures which are to be searched for, or individually for the various signatures that are to be searched for. Indeed, in some embodiments the number of points may vary from one signature to another. Furthermore, the location of the bytes used for the purposes of comparison within the signature can similarly be set globally or alternatively can be set individually for the different signatures that are to be searched for. The number and location of bytes which are to be used as a basis for comparison can be set at the time at which the signatures are created or alternatively can be determined as part of a search process.

Where the number and location of bytes which are to be used as a basis for comparison is set at the time at which the signatures are created, the signatures stored in the database 14 may only comprise the bytes which are to be used as a basis for comparison, together with data indicating the position of those bytes within the segment forming the basis for the signature.

The preceding description has focussed upon a search for a single signature 19. It will be appreciated that in an operational system it will usually (although not necessarily always) be the case that a plurality of signatures are searched for. In such a case the search can operate by loading a segment of the evidence file and comparing the loaded segment of the evidence file to each signature of interest. Such an approach provides good scalability for searches involving large numbers of signatures, as shown by experiments described in further detail below.

The comparison of a signature to a particular segment may make use of a trigger byte. That is, a single trigger byte of the signature may be compared to a single byte of the loaded segment of the evidence file. Comparisons of further bytes may then be conditional upon the trigger byte of the signature matching the corresponding byte of the loaded segment of the evidence file.

It has been described above that a plurality (although preferably not all) bytes of the signature are compared to corresponding bytes of the loaded segment of the evidence file. It will be appreciated that where comparisons of the plurality of bytes are carried out in a serial fashion, if one of the comparisons does not yield a match, this could result in further comparisons being avoided thereby improving efficiency. For example, referring again to FIG. 8, having determined that the byte 30 of the signature 19 does not match the corresponding byte of the segment 28, comparisons using the bytes 31, 32 need not be carried out. In some embodiments, the comparisons of the plurality of bytes may be carried out in parallel.

It has been described above that currently preferred embodiments use sixteen points of reference for comparison between a signature and a segment of the evidence file. The probability that a particular sixteen points of the signature match the corresponding bytes in a segment of an evidence file is remote. A single byte can take any one of $2^8=256$ distinct values. The probability that a byte in a segment in an evidence file matches a corresponding byte in a signature is therefore 1/256. The probability that all sixteen values in a block in an evidence file match the corresponding bytes of the signature is therefore $(1/256)^{16}=2.93\times10^{-39}$.

It will be appreciated that the probability analysis set out above assumes that each byte value is equally likely (i.e. the probability of any particular value is 1/256). This is likely to be more true for some file types than others.

FIGS. 9A to 9D represent distributions of byte values in different types of files.

Figure 9A:
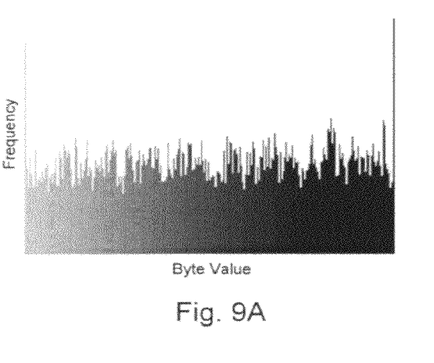
FIGS. 9A to 9D are graphs showing distributions of byte values in different types of files.

FIG. 9A shows the distribution of byte values in an example JPEG file. Due to the compression that this file type uses, there is an approximately even spread of byte values.

Figure 9B:
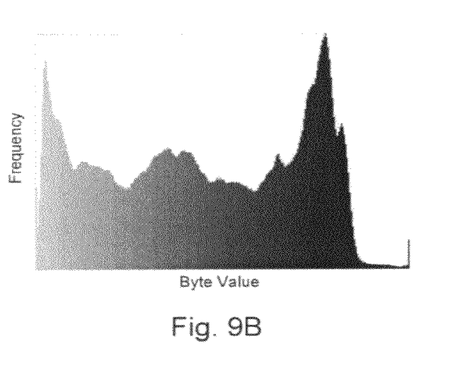

FIG. 9B shows the distribution of byte values in a Bitmap file. It can be seen that in the case of a Bitmap file, byte values are less evenly distributed due to the Red-Green-Blue encoding required by this file type and the lack of compression.

Figure 9C:
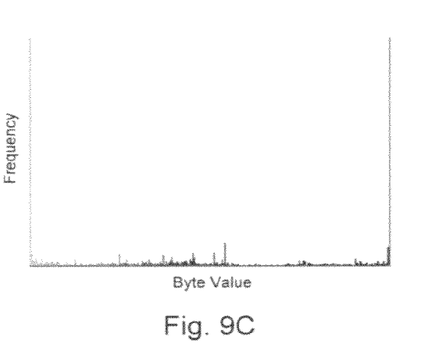
Figure 9D:
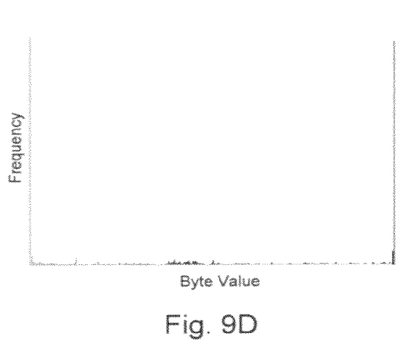

FIGS. 9C and 9D show the byte value distribution for an executable file and a Microsoft Word file respectively, and both demonstrate a very uneven distribution due to the large number of zero values encapsulated in the files. For the executable file, this is due to value redundancy in the program code, and for the Word document, the zeroes are required for formatting purposes.

The approximately even distribution of byte values in a JPEG file (due to file compression) provides a more robust search for JPEG images as the approach described herein utilises byte values to create a signature. In the case of Word documents and executables, the large number of zero values may lead to a larger set of false positives being generated using the techniques described above. It follows that whilst the analysis of probabilities set out above holds true of JPEG files, it is less true for executable file and Microsoft Word files. That said, it will be appreciated that the methods used can be used to determine whether any data of interest is included in a data store, particularly if processing is carried out to handle false positive results by, for example, additional investigation.

Given that the methods described herein have particular application in searching for image files, and given that many image files are stored in a compressed form such as (but not limited to) JPEG, it can be seen that the distribution of byte values as shown in FIGS. 9A to 9D indicates that the methods described should produce robust results when used to locate image files.

It was described above that the evidence file 17 was created by taking an image of a hard disk drive of interest. In an alternative embodiment of the invention the evidence file 17 may be generated by Internet searching based upon Web robot or Web spider techniques. Generation of evidence files in this way is now described with reference to FIGS. 10 and 11.

Figure 10:
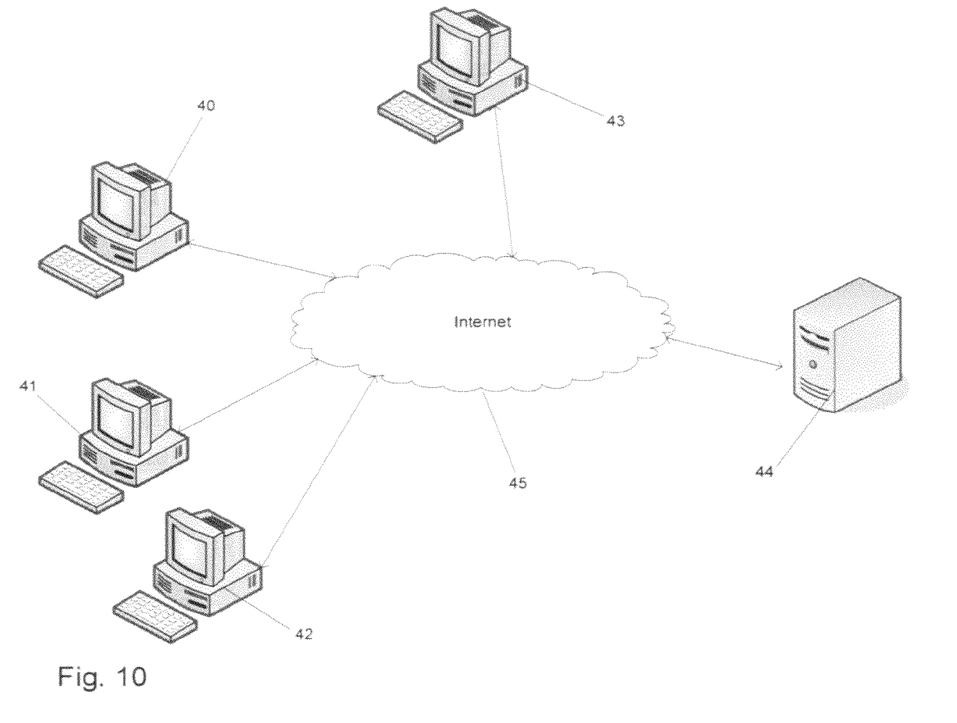
FIG. 10 is a schematic illustration of a network of computers connected to a server via the Internet.

FIG. 10 shows four computers 40, 41, 42, 43 connected to a server 44 by way of the Internet 45. Each of the computers 40, 41, 42, 43 is provided with web browser software such that web pages provided by the server 44 can be retrieved by the computers 40, 41, 42, 43 over the Internet 45 and displayed to a user.

The computer 43 is arranged to generate an evidence file 17 by way of Internet searching techniques. More specifically, referring now to FIG. 11, a search is initiated by directing the computer 43 to an initial starting page 46, for example a main home page of an image gallery or photo-sharing website. The computer 43 downloads the HTML content for the initial starting page 46, and detects hyperlinks 47, 48 on the initial starting page 46 during the download process.

Figure 11:
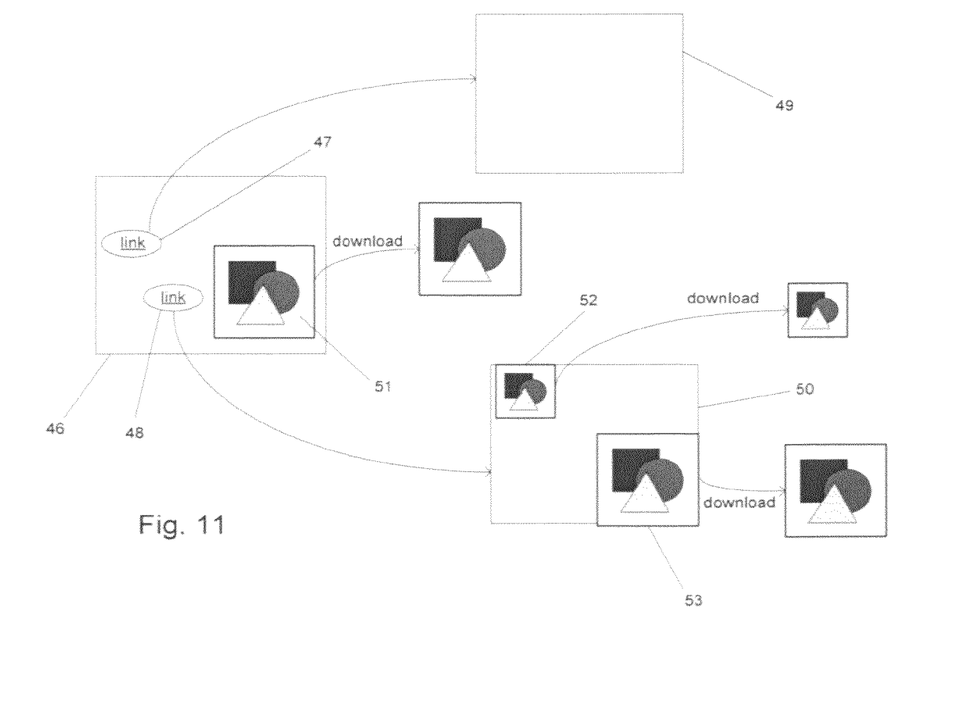
FIG. 11 is a schematic illustration of processing carried out to retrieve images by following links.

The destinations of the hyperlinks 47, 48 are further pages 49 50. The further pages 49, 50 are downloaded in parallel and the process is repeated so that the computer 43 automatically traverses the site, downloading any pages referred to by links on a particular page.

It can be seen that the initial starting page 46 includes an image 51. It can also be seen that the further page 50 includes two images 52, 53 (the further page 49 does not include any images). The images 51, 52, 53 are downloaded by the computer 43 and written to the evidence file 17. In this way an evidence file is created including all images included on any webpage linked to the initial starting page 46. The evidence file 17 can then be processed in the manner described above.

It has been described above that the evidence file 17 can be created by taking an image of a hard disk drive of interest, or alternatively by retrieving data from the Internet. It will, however, be appreciated that the evidence file 17 can be created in any suitable manner.

Although preferred embodiments of the invention have been described above, it will be appreciated that various modifications can be made to the described embodiments without departing from the spirit and scope of the present invention. In particular, it will be appreciated that the terms "computer" and "computing device" are to be construed broadly so as to cover not only desktop and laptop computers, but also to cover devices such as personal digital assistants (PDAs), mobile telephones, Blackberry® and other similar devices and set top boxes. Similarly the term mass storage device as used herein is used to mean any non-volatile storage device. In particular, the term mass storage is not used to denote a storage device having any particular data capacity.

Use of the methods described above is now described with reference to experiments carried out by the inventors.

The described experiments were carried out on two computers. A first computer had a 2 GHz AMD Athlon processor, 512 MB RAM and ran the Suse Linux 10 operating system. A second computer had a 3 GHz Pentium 4 processor, 1 GB RAM and also ran the Suse Linux 10 operating system. The first computer represents a similar set up to that which would typically be deployed in the field on a laptop by a forensic analyst searching for images of interest, and therefore provides a useful benchmark for speed and efficiency tests. The second computer provides more computational power as would be typically expected within a forensics laboratory.

Four evidence files, ranging from 5 GB to 20 GB in size were used as the basis of the evidence search. Each of these evidence files was an image taken from a real computer hard disk drives. The filetypes in the evidence files were varied, including MP3 files, system files (e.g. dat, swf, dll, and Master File Table information), executable files (.exe), ogg files, pdf files, Microsoft Office files (e.g. .ppt, .doc), as well as JPEG (.jpg) files.

The evidence files included a wide range of digital picture files other than the specific image files of interest. There were approximately 400 JPEG pictures in the 5 GB evidence file and approximately 3200 JPEG pictures in the 20 GB evidence file. This ensured that the search process had opportunities to return false positives by incorrectly identifying a digital picture.

The images of interest were taken with the same camera, of a similar subject and in similar lighting conditions. The images of interest were amongst a set of approximately 650 related digital images. The same segment was used as the basis of the signature for each image of interest. In all cases, the application successfully identified the signatures and locations of the files of interest and no false positives were returned.

It was described above that it is preferred to use a segment of an image other than the first segment as a signature for that image. The experiments carried out demonstrated the potential problem of using the first segment to provide a reliable fingerprint.

Ten picture files were searched for, seven of which were included in the searched evidence file and three which were not. Two searches were conducted, one based upon signatures generated using the first segment of each image and another based upon signatures generated using the thousandth segment of each image.

Table 1 shows that where the thousandth segment of each image was used as the basis for the signature, the images were correctly identified and located within the evidence file, each of the seven images included in the evidence file being identified once, and each of the three images not included in the evidence file not being identified at all. However, when the first segment of each image was used as the basis for the signature of each image, the results produced many false positives, including results indicating multiple locations of a signature when only one occurrence of the image was included in the evidence file.

Thus, as Table 1 demonstrates on a small test set, the first segment cannot be used for reliable signature matching of data, particularly if the data comes from the same source camera or application. However, data from elsewhere in the file provides a robust signature.

TABLE 1

| Filename | File included in evidence file | Number of locations using signature based upon Segment 1 | Number of locations using signature based upon Segment 1000 |
|---|---|---|---|
| accr3.jpg | Yes | 3 | 1 |
| cbeiw2.jpg | Yes | 2 | 1 |
| cbeiw8.jpg | Yes | 3 | 1 |
| cbeiw27.jpg | Yes | 1 | 1 |
| cbemd2.jpg | Yes | 2 | 1 |
| cbemd7.jpg | Yes | 1 | 1 |
| cbeob1.jpg | Yes | 3 | 1 |
| cufra28.jpg | No | 3 | 0 |
| cufsb2.jpg | No | 3 | 0 |
| chdc2.jpg | No | 3 | 0 |

Figure 12:
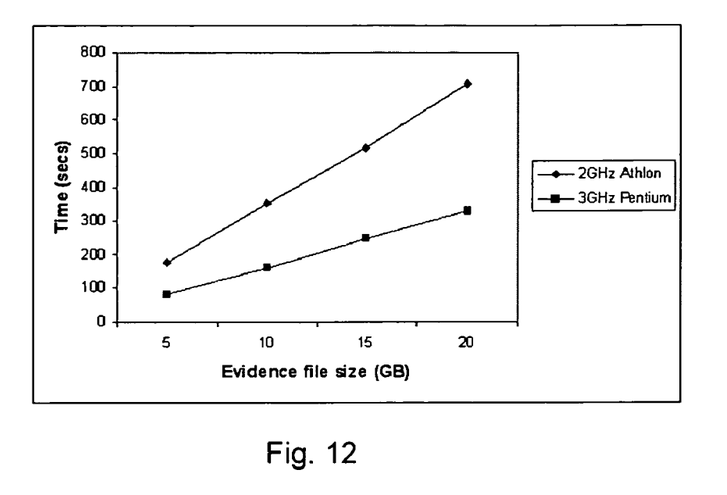
FIG. 12 is a graph showing time taken to search for signature data in data stores of differing sizes using two computers having different processor speeds.

FIG. 12 is a graph showing the time taken to search four different evidence files, having sizes of 5 GB, 10 GB, 15 GB and 20 GB, for one hundred signatures. Diamond indicators represent searches carried out using the computer having a 2 GHz processor, whilst square indicators represent searches carried out using the computer having a 3 GHz processor.

The search and correct identification of the one hundred fingerprints within a 5 GB evidence file using the computer having a 2 GHz processor took approximately 2 minutes 55 seconds. This computer took approximately 11 minutes 47 seconds to carry out the same search when the evidence file has a size of 20 GB. As would be expected, the searches using the computer having the 3 GHz Pentium processor were significantly faster: It took approximately 1 minute 20 seconds to search the 5 GB evidence file and 5 minutes 25 seconds to search the 20 GB evidence file.

With a 5 GB search taking approximately 175 seconds when carried out using the computer having the 2 GHz processor and 80 seconds when carried out using the computer having the 3 GHz processor, it can be assumed that it may take approximately 60 minutes and 30 minutes respectively to search all bytes on a 100 GB hard drive. This is significantly faster than a manual search of the same scale. In addition, the search is automated, avoiding the need for manual inspection of images.

Figure 13:
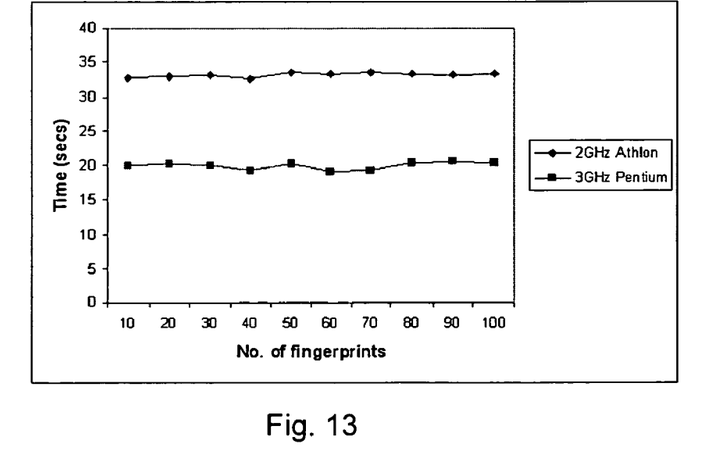
FIG. 13 is a graph showing how the number of signatures searched for affects search time.

In order to evaluate the impact of searching for more than one signature, between ten and one hundred signatures were simultaneously searched for within a 1 GB evidence file on both of the computers described above and the results are presented in a graph in FIG. 13. The searches were repeated three times due to the dependency of the timings on other processes running, and the best times obtained are shown in the graph of FIG. 13.

On the computer having a 2 GHz processor, the best real times are noted for the forty and ten signature searches at 32.5 seconds and 32.8 seconds respectively. On the computer having the 3 GHz processor, the best real time is noted for the sixty and forty signature searches at 19 seconds and 19.1 seconds respectively.

The efficiency of the approach may be demonstrated by the average search time per signature. The ten signature search took 32.8 seconds while the one hundred signature search took 33.3 seconds on the computer having the 2 GHz processor. That is, the time taken per signature is approximately inversely proportional to the number of signatures searched for. That is, in the ten signature search the time per signature was approximately 3.3 seconds, while in the one hundred signature search the time per signature was approximately 0.3 seconds. While the times taken to search on the computer having the 3 Ghz processor are faster, the relationships described above are very similar.

FIG. 13 and the discussion set out above shows that the methods described herein can be scaled to search for large numbers of signatures without degrading performance unacceptably.

Whilst it has been described herein that the methods set out above have applicability in locating malicious images, possession of which is contrary to law, the experiments described above were all carried out using benign images.

The design presented herein and the specific aspects illustrated are meant not to be limiting, but may include alternate components while still incorporating the teachings and benefits of the invention. While the invention has thus been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

What is claimed is:

1. A method of determining whether particular data is included in a data store comprising a plurality of second segments, wherein the particular data comprises a plurality of first data values, the data store comprises a plurality of second data values and the method comprises:
   obtaining identification data associated with said particular data, said identification data comprising a subset of said first data values;
   retrieving a portion of said data store, wherein said portion is one of said plurality of second segments; and
   determining whether at least a predetermined number of first data values of said identification data have a predetermined relationship with corresponding second data values of said retrieved portion of the data store, so as to determine whether the particular data is included in the data store.

2. A method according to claim 1, wherein said predetermined relationship is equality.

3. A method according to claim 1, wherein
   said particular data comprises a plurality of first segments, each first segment comprising a plurality of said first data values; and
   said identification data comprises data values taken from one of said first segments.

4. A method according to claim 3, further comprising processing the particular data to create said plurality of first segments.

5. A method according to claim 1, wherein
said particular data comprises a plurality of first segments, each first segment comprising a plurality of said first data values; and
said identification data is one of said first segments.

6. A method according to claim 1, wherein each of said second segments is defined by a file system associated with said data store.

7. A method according to claim 1, wherein said data store is an image of a storage device.

8. A method according to claim 7, wherein said storage device is a non-volatile storage device.

9. A method according to claim 7, wherein each of said second segments is a segment defined with reference to a file system managing the storage device.

10. A method according to claim 1, wherein said predetermined number is less than a number of data values in said identification data.

11. A method according to claim 1, wherein said data values are bytes.

12. A method according to claim 1, wherein said particular data is a file.

13. A method according to claim 12, wherein said particular data is an image file.

14. A method according to claim 1, wherein said data store stores data retrieved from the Internet.

15. A non-transitory computer readable medium carrying computer readable instructions arranged to control a computer to carry out a method for determining whether particular data is included in a data store comprising a plurality of second segments, wherein the particular data comprises a plurality of first data values, the data store comprises a plurality of second data values and the computer readable instructions comprise instructions controlling the computer to:
obtain identification data associated with said particular data, said identification data comprising a subset of said first data values;
retrieve a portion of said data store, wherein said portion is one of said plurality of second segments; and
determine whether at least a predetermined number of data values of said identification data have a predetermined relationship with corresponding second data values of said retrieved portion of the data store.

16. Apparatus for determining whether particular data is included in a data store comprising a plurality of second segments, wherein the particular data comprises a plurality of first data values, and the data store comprises a plurality of second data values, the apparatus comprising:
a memory storing processor readable instructions; and
a processor configured to read and execute instructions stored in said memory;
wherein said processor readable instructions comprise instructions configured to control the processor to:
obtain identification data associated with said particular data, said identification data comprising a subset of said first data values;
retrieve a portion of said data store, wherein said portion is one of said plurality of second segments; and
determine whether at least a predetermined number of data values of said identification data have a predetermined relationship with corresponding second data values of said retrieved portion of the data store.

17. A method of determining whether particular data is included in a data store, wherein the particular data comprises a plurality of first data values arranged in a plurality of first segments, the data store comprises a plurality of second data values arranged in a plurality of second segments and the method comprises:
obtaining identification data associated with said particular data, said identification data comprising first data values taken from one of said first segments;
retrieving one of said second segments from said data store;
determining whether at least a predetermined number of first data values of said identification data have a predetermined relationship with corresponding second data values of said retrieved second segment, so as to determine whether the particular data is included in the data store.

18. A method according to claim 17, wherein said predetermined relationship is equality.

19. A method according to claim 17, further comprising processing said particular data to create said plurality of first segments.

20. A method according to claim 17, wherein each of said first segments comprises a first number of data values and each of said second segments comprises a second number of data values.

21. A method according to claim 20, wherein said predetermined number of first data values is less than said first number.

22. A method according to claim 20, wherein said second number is an integer multiple of said first number, and said first number is smaller than said second number.

23. A method according to claim 20, wherein said first and second numbers are equal.

24. A method according to claim 17, wherein said data values are bytes.

25. A method according to claim 17, wherein said particular data is a file.

26. A method according to claim 17, wherein said particular data is an image file.

27. A method according to claim 17, wherein said data store stores data retrieved from the Internet.

28. A method according to claim 27, further comprising:
selecting a web page;
following at least one link from said selected webpage to a further webpage;
retrieving data from at least one of said selected web page and said further webpage; and
storing said retrieved data in said data store.

29. A method according to claim 28, further comprising repeating said selecting and said following a plurality of times, and retrieving data from a plurality of further webpages.

30. A method according to claim 29, wherein said retrieved data is at least one image file.

31. A method according to claim 17, further comprising:
storing a plurality of identification data items in a database; and
retrieving said identification data items for use in processing to determine whether particular data is included in the data store.

32. A method according to claim 17, wherein each of said second segments is defined by a file system associated with said data store.

33. A method according to claim 17, wherein said data store is an image of a storage device.

34. A method according to claim 33, wherein said storage device is a non-volatile storage device.

35. A method according to claim 34, wherein each of said second segments is a segment defined with reference to a file system managing the storage device.

36. A method according to claim 17, wherein each of said first segments is defined with reference to a file system.

37. A non-transitory computer readable medium carrying computer readable instructions arranged to control a computer to carry out a method for determining whether particular data is included in a data store, wherein the particular data comprises a plurality of first data values arranged in a plurality of first segments, the data store comprises a plurality of second data values arranged in a plurality of second segments and the method comprises and the computer readable instructions comprise instructions controlling the computer to:

obtain identification data associated with said particular data, said identification data comprising data values taken from one of said first segments;

retrieve one of said second segments from said data store; and     determine whether at least a predetermined number of data values of said identification data have a predetermined relationship with corresponding second data values of said retrieved second segment.

38. Apparatus for determining whether particular data is included in a data store, wherein the particular data comprises a plurality of first data values arranged in a plurality of first segments, and the data store comprises a plurality of second data values arranged in a plurality of second segments, the apparatus comprising:

a memory storing processor readable instructions; and a processor configured to read and execute instructions stored in said memory;

wherein said processor readable instructions comprise instructions configured to control the processor to:

obtain identification data associated with said particular data, said identification data comprising data values taken from one of said first segments;

retrieve one of said second segments from said data store; and     determine whether at least a predetermined number of data values of said identification data have a predetermined relationship with corresponding second data values of said retrieved second segment.

* * * * *